United States Patent Office 3,767,806
Patented Oct. 23, 1973

3,767,806
SYNERGISTIC INSECTICIDES
Francois Rauch, Marseille, France, assignor to
Roussel-UCLAF, Paris, France
No Drawing. Filed Jan. 20, 1971, Ser. No. 108,187
Claims priority, application France, Feb. 4, 1970,
7003912
Int. Cl. A01n 9/02, 9/24, 9/28
U.S. Cl. 424—278                2 Claims

ABSTRACT OF THE DISCLOSURE

Synergistic insecticidal compositions containing a mixture of allethrolone d-trans chrysanthemate (A) and either 5-benzyl-3-furyl-methyl-d-trans chrysanthemate (B) or 5-benzyl-3-furyl-methyl dl-cis-trans chrysanthemate (C) optionally containing piperonyl butoxide or other synergists and to methods of killing insects.

STATE OF THE ART

French Pat. 1,503,260 discloses that 5-benzyl-3-furylmethyl d-trans chrysanthemate (B) and 5-benzyl-3-furylmethyl dl-cis-trans chrysanthemate (C) have a very high lethal activity against insects but the said compounds possess a relatively weak KD (Knock Down) power which is inferior to that possessed by allethrolone d-trans chrysanthemate (A). The latter compound is distinguished by a very high KD effect although its toxicity is not always sufficient and is apparently inferior to the compounds of the said Frenct patent.

Direct spraying tests effected on household flies have been conducted to estimate the KD or Knock Down effect of Compounds A, B, and C by measuring the time necessary to kill 50% of flies with the same dose of the products ($KT_{50}$). The $KT_{50}$ for Compound A was 540 seconds, for Compound B was 672 seconds and for Compound C was 900 seconds. In a second test using piperonyl butoxide as a synergist, the $KT_{50}$ was 252 seconds for Compound A, 348 seconds for Compound B and 372 seconds for Compound C.

The Knock Down power, the ability to quickly knock down flying insects or to immobilize crawling insects, is a very desired quality. In fact, the speed of action symbolized by the KD effect is of great interest, for instance where it is preferable to knock down the insect as quickly as possible rather than kill it which can sooner or later occur and in undesirable places. 5-benzyl-3-furyl-methyl d-trans chrysanthemate and 5-benzyl-3-furyl-methyl dl-cis-trans chrysanthemate when used alone lack the speed of action required of a good insecticide.

OBJECTS OF THE INVENTION

It is an object of the invention to provide novel synergistic insecticidal compositions.

It is another object of the invention to provide a novel method of killing insects.

These and other objects and advantages of the invention will become obvious from the following detailed description.

THE INVENTION

The novel synergistic insecticidal compositions of the invention are comprised of a mixture of allethrolone d-trans chrysanthemate and a second member selected from the group consisting of 5-benzyl-3-furyl-methyl d-trans chrysanthemate (B) and 5-benzyl-3-furyl-methyl dl-cis-trans chrysanthemate which compositions have a superior knock down time than the individual components. The synergistic effect is shown by the fact that insecticidal activity of the novel compositions exceeds appreciably the sum of the effects of the individual components.

The compositions of the invention have a greater knock down activity while maintaining a high lethal activity. The said compositions preferably contain 80 to 50% by weight of Compound A with 20 to 50% by weight of Compound B or C and especially 60 to 50% by weight of Compound A to 40 to 50% by weight of Compound B or C. Moreover, the compositions may also contain up to 90% by weight of piperonyl butoxide as a synergist.

The insecticidal compositions of the invention are effective against insects by contact therewith or by ingestion by the insects. The compositions may be in the form of powders, granules, suspensions, emulsions, solutions, aerosols, combustible strips, baits, or any other preparation generally used for insecticides.

The compositions generally contain besides the active ingredients a vehicle and/or a non-ionic surface active agent to assure a uniform dispersion of substances making up the mixture. The vehicle used may be a liquid such as water, alcohol, hydrocarbons or other organic solvents, mineral, animal or vegetable oils or a powder such as talc, clay, silicates, kieselguhr, etc.

The compositions are useful for combatting harmful insects either in domestic areas, agricultural area, food industry, grain or consumable goods warehouses, etc. An example of a suitable composition is an emulsifiable concentrate containing 0.5% by weight of allethrolone di-trans chrysanthemate, 0.50% by weight of 5-benzyl-3-furyl-methyl dl-cis-trans chrysanthemate, 10% by weight of piperonyl butoxide, 6% by weight of Tween 80, 0.2% by weight of topanol A and 82.8% by weight of xylol. The composition preferably contain 0.2 to 90% by weight of active ingredients.

The novel method of the invention for killing insects comprises contacting insects with a lethal amount of a mixture of Compound A with Compound B or Compound C. The contact may be external or internal contact.

In the following example there are described several preferred embodiments to illustrate the invention. However, it should be understood that the invention is not intended to be limited to the specific embodiments.

EXAMPLE

To determine the Knock Down time activity of the compositions of the invention, 3 day old house flies received a topical application of the test compositions on the back of the insects. The products were applied in an acetone solution and three treatments using 5 insects were made for each dosage. The tests were run twice and the results reported therein were on 30 insects for each dose. The kill time was determined at 2, 4, 6, 8, and 10 minutes and 24 hours after the treatment. The compositions reported in the following table contained 10 parts by weight of piperonyl butoxide per part by weight of the test products. The $KT_{50}$ determined is the time necessary to kill 50% of the flies with a fixed dose of the products (100 nanograms) and this time is inversely proportional to rate of action of the products.

| Compound | Doses of active ingredient in $10^{-9}$ gm./insect | $KT_{50}$ in seconds |
| --- | --- | --- |
| Compound A | 100 | 288 |
| Compound B | 100 | 330 |
| Compound C | 100 | 303 |
| Compound A plus Compound C | 60% A plus 40% C | 235 |
| Do | 50% A plus 50% C | 221 |
| Compound A plus Compound B | 60% A plus 40% B | 265 |
| Do | 50% A plus 50% B | 267 |

The results in the table show clearly the synergistic activity of the mixtures of Compounds A and C and Compounds A and B as compared to the activity of A, B or C alone.

Various modifications of the compositions and method of the invention may be made without departing from the spirit or scope thereof and it is to be understood that the invention is to be limited only as defined in the appended claims.

I claim:

1. An insecticidal composition comprising a mixture of 10 parts by weight butoxide with 1 part by weight of a mixture of 60 to 50% by weight of allethrolone d-trans chrysanthemate and 40 to 50% by weight of 5-benzyl-3-furyl-methyl dl-cis-trans chrysanthemate.

2. A method of combatting insects comprising contacting insects with a lethal amount of the composition of claim 1 of 80 to 50% by weight of allethrolone d-trans chrysanthemate and 20 to 50% by weight of 5-benzyl-3-furyl methyl dl-cis-trans chrysanthemate.

References Cited

UNITED STATES PATENTS

| | | | |
|---|---|---|---|
| 2,607,796 | 8/1952 | Schechter | 424—306 X |
| 3,159,535 | 12/1964 | Sesso et al. | 424—306 X |
| 3,265,568 | 8/1966 | Salvesen et al. | 424—306 X |
| 3,184,378 | 5/1965 | Cole | 424—306 X |
| 3,542,928 | 11/1970 | Elliott | 424—306 X |
| 3,557,259 | 1/1971 | Montgomery | 424—306 X |

JEROME D. GOLDBERG, Primary Examiner

A. J. ROBINSON, Assistant Examiner

U.S. Cl. X.R.

424—285, 306